(12) United States Patent
Venkatraman et al.

(10) Patent No.: US 8,705,533 B1
(45) Date of Patent: Apr. 22, 2014

(54) FAST PACKET ENCAPSULATION USING TEMPLATES

(75) Inventors: Chandrasekaran Venkatraman, Cupertino, CA (US); Avanindra Godbole, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 512 days.

(21) Appl. No.: 12/964,887

(22) Filed: Dec. 10, 2010

(51) Int. Cl.
*H04L 12/28* (2006.01)
*H04L 12/54* (2013.01)
*H04J 3/16* (2006.01)
*H04J 3/22* (2006.01)
*G06F 15/16* (2006.01)
*G06F 9/26* (2006.01)
*G06F 9/34* (2006.01)

(52) U.S. Cl.
USPC ........... 370/392; 370/428; 370/469; 709/230; 711/217

(58) Field of Classification Search
USPC ............ 370/392, 428, 469; 709/230; 711/217
See application file for complete search history.

(56) References Cited

U.S. PATENT DOCUMENTS

| | | | |
|---|---|---|---|
| 6,266,700 B1 * | 7/2001 | Baker et al. .................. 709/230 |
| 7,315,900 B1 * | 1/2008 | Ofelt et al. ................... 709/238 |
| 2003/0152078 A1 * | 8/2003 | Henderson et al. ........... 370/389 |
| 2005/0041660 A1 * | 2/2005 | Pennec et al. ................ 370/389 |
| 2007/0010987 A1 * | 1/2007 | Guenthner et al. ............. 703/26 |
| 2007/0223481 A1 * | 9/2007 | Sivakumar et al. ........... 370/392 |
| 2010/0098109 A1 * | 4/2010 | Le Pennec et al. ........... 370/477 |

* cited by examiner

*Primary Examiner* — Alpus H Hsu
*Assistant Examiner* — Yee Lam
(74) *Attorney, Agent, or Firm* — Harrity & Harrity, LLP

(57) ABSTRACT

A network device assigns unique encoded values, represented by mnemonics, to protocol headers supported by the network device, and defines a plurality of templates, where each template includes a set of the mnemonics. The network device also stores the plurality of templates in a template table, where the template table enables the network device to create one or more protocol headers for packets transmitted by the network device.

24 Claims, 11 Drawing Sheets

FAST PACKET ENCAPSULATION USING TEMPLATES

BACKGROUND

Processors of network devices (e.g., routers, switches, etc.) encapsulate packets with one or more headers. Some headers are data bytes related to specific network protocols, such as Ethernet, Internet protocol version 4 (IPv4), Fibre Channel (FC), IEEE 802.1, etc. Flexibility and performance are two criteria required for encapsulating packets with headers. Typically, packet header encapsulation is achieved using specially designed micro-code driven engines that execute a sequence of instructions to process packet headers. However, micro-coded engines present several challenges, such as performance limitations (e.g., time taken to process a packet is directly proportional to the number of instructions executed), micro-code memory requirements, complexity, protracted development schedules, etc. For example, a micro-coded engine will be an over-design when the set of protocol headers is somewhat pre-defined and an amount of flexibility required is bound by the processor's application space. In another example, if the processor's port rates are high, a micro-coded engine may become overly complex and may be unable to handle the high port rates.

SUMMARY

According to one aspect, a method may be implemented by a network device. The method may include assigning, by the network device, unique encoded values, represented by mnemonics, to protocol headers supported by the network device. The method may also include defining, by the network device, a plurality of templates, where each template includes a set of the mnemonics, and storing, by the network device, the plurality of templates in a template table, where the template table enables the network device to create one or more protocol headers for packets transmitted by the network device.

According to another aspect, a network device may include a processor to assign unique encoded values, represented by mnemonics, to protocol headers supported by the network device, and define a plurality of templates, where each template includes a set of the mnemonics. The processor may also store the plurality of templates in a template table, and use the template table to create one or more protocol headers for packets transmitted by the network device.

According to still another aspect, a network device may include an egress rewrite component to assign unique encoded values, represented by mnemonics, to headers supported by the network device, and define a plurality of templates, where each template includes a set of the mnemonics. The egress rewrite component may also use the plurality of templates to create one or more protocol headers for packets transmitted by the network device.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
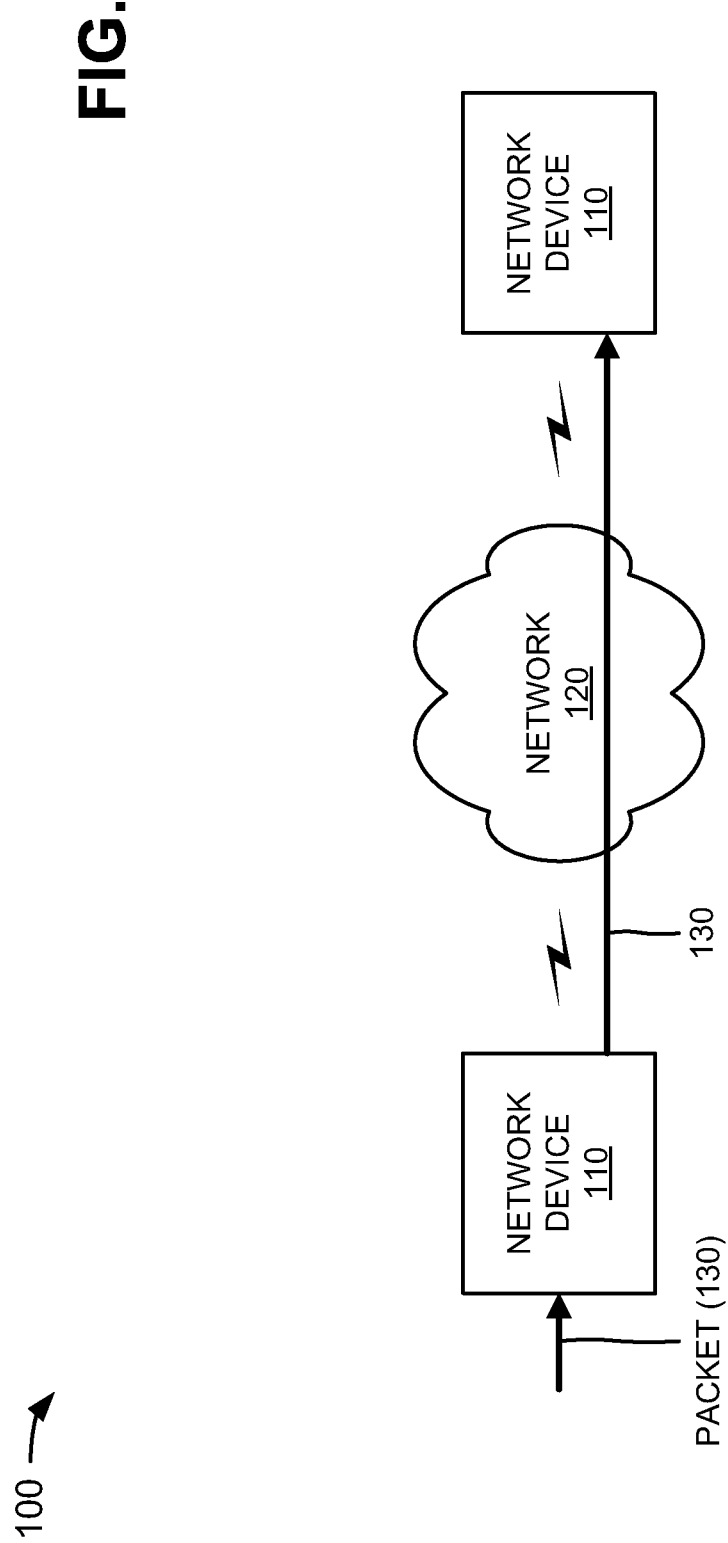
FIG. 1 is a diagram of an example network in which systems and/or methods described herein may be implemented.

The following detailed description refers to the accompanying drawings. The same reference numbers in different drawings may identify the same or similar elements.

Systems and/or methods described herein may provide fast packet encapsulation using templates. The systems and/or methods may achieve line-rate performance (e.g., without any micro-code), may provide flexibility for packet encapsulation (e.g., via selection from a variety of protocol templates), and may simplify packet encapsulation. The systems and/or methods may assign unique encoded values (e.g., represented by mnemonics) to various protocol headers, and may define a template as a set of mnemonics arranged in a sequence. The sequence of the mnemonics may determine a protocol stack provided in a packet. The systems and/or methods may generate a variety of templates, and may store the templates in a template table. When a packet is received, the systems and/or methods may select a particular template from the template table for the packet (e.g., based on a packet processing decision prior to packet encapsulation). The systems and/or methods may decode the mnemonics of the particular template using pre-determined, fixed value comparisons and by processing one mnemonic per clock cycle. Decoding of the mnemonics may determine protocol bytes for sub-headers of the packet. The systems and/or methods may assemble the individual sub-headers to form a complete protocol header for the packet, and may forward the packet with the protocol header.

In an example implementation, the systems and/or methods may support a variety of mnemonics, and may support a number (e.g., twelve) of mnemonics per template. To reduce processing latency, the systems and/or methods may process a particular template with three encapsulation mechanisms, where each encapsulation mechanism may handle four different sequential mnemonics from the particular template.

As part of the template, the systems and/or methods may program a pointer to a constant data array (e.g., table) in any mnemonic position. Each pointer programmed in a mnemonic position may cause corresponding constant data from the array to be inserted in the packet header. Such an arrangement may conserve upstream descriptor memory space when the value of bytes in the packet header is limited to a small set of constants. In one example implementation, the systems and/or methods may utilize conditional mnemonics that cause protocol bytes to be inserted in the packet header if corresponding information is available from upstream. For example, Layer 2 tags may be added to the packet header if a tag identifier (ID) is valid in an upstream notification. Otherwise, the mnemonic may be ignored. Such a feature may enable using the same template for multiple flows that differ in Layer 2 tagging behavior.

The systems and/or methods may also provide fixed latency and high performance. For example, the systems and/or methods may support up to two-hundred (200) million packets per second, which may equate to one-hundred and twenty (120) gigabits of data per second.

The term "component," as used herein, is intended to be broadly construed to include hardware (e.g., a processor, a microprocessor, an ASIC, a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

The term "mnemonic," as used herein, is intended to be broadly construed to include any word, words, construct, constructs, encoded values, enumerated values, letter, letters, etc. that may be representative of other information. For example, a mnemonic may be used to represent a name of a packet protocol header. In another example, a mnemonic may imply a sub-header or sub-field of a network header (e.g., DASA may be a mnemonic for an Ethernet network header). Further examples of mnemonics are provided below in Table 2.

FIG. 1 is a diagram of an example network 100 in which systems and/or methods described herein may be implemented. As illustrated, network 100 may include network devices 110 interconnected by a network 120. Components of network 100 may interconnect via wired and/or wireless connections or links. Two network devices 110 and one network 120 have been illustrated in FIG. 1 for simplicity. In practice, there may be more network devices 110 and/or networks 120. Also, in some instances, one or more of the components of network 100 may perform one or more tasks described as being performed by another one or more of the components of network 100.

Network device 110 may include a traffic (e.g., packet) transfer device, such as a gateway, a router, a switch, a firewall, a network interface card (NIC), a hub, a bridge, a proxy server, an optical add-drop multiplexer (OADM), or some other type of device that processes and/or transfers traffic. In an example implementation, network device 110 may include a device that is capable of transmitting information to and/or receiving information from network 120 and other network devices 110.

Network 120 may include a local area network (LAN), a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of networks.

As further shown in FIG. 1, one network device 110 may receive a packet 130, and may forward packet 130 to the other network device 110 via network 120. In one example implementation, the one network device 110 may perform encapsulation of packet 130 before forwarding packet 130. The packet encapsulation may be performed by the systems and/or methods described herein. For example, network device 110 may assign unique encoded values, represented by mnemonics, to protocol headers, may define templates based on sets of the mnemonics, and may store the templates in a template table (e.g., provided in network device 110). Network device 110 may receive packet 130 (e.g., at later point in time after creation of the template table), and may select, for packet 130, a particular template from the template table. Network device 110 may decode mnemonics of the particular template to determine protocol bytes for sub-headers, and may merge the sub-headers to create a protocol header for packet 130. Network device 110 may forward packet 130 (e.g., to the other network device 110) based on the created protocol header.

In one example, network device 110 may provide a pointer to a constant data array for one or more of the mnemonics of the particular template, and may enable the pointers to cause constant data from the array to be inserted in the protocol header of packet 130. In another example, network device 110 may decode each mnemonic of the particular template per each clock cycle, and may decode the mnemonics of the particular template using predetermined fixed-value comparisons.

Although FIG. 1 shows example components of network 100, in other implementations, network 100 may include fewer components, different components, differently arranged components, or additional components than depicted in FIG. 1.

Figure 2:
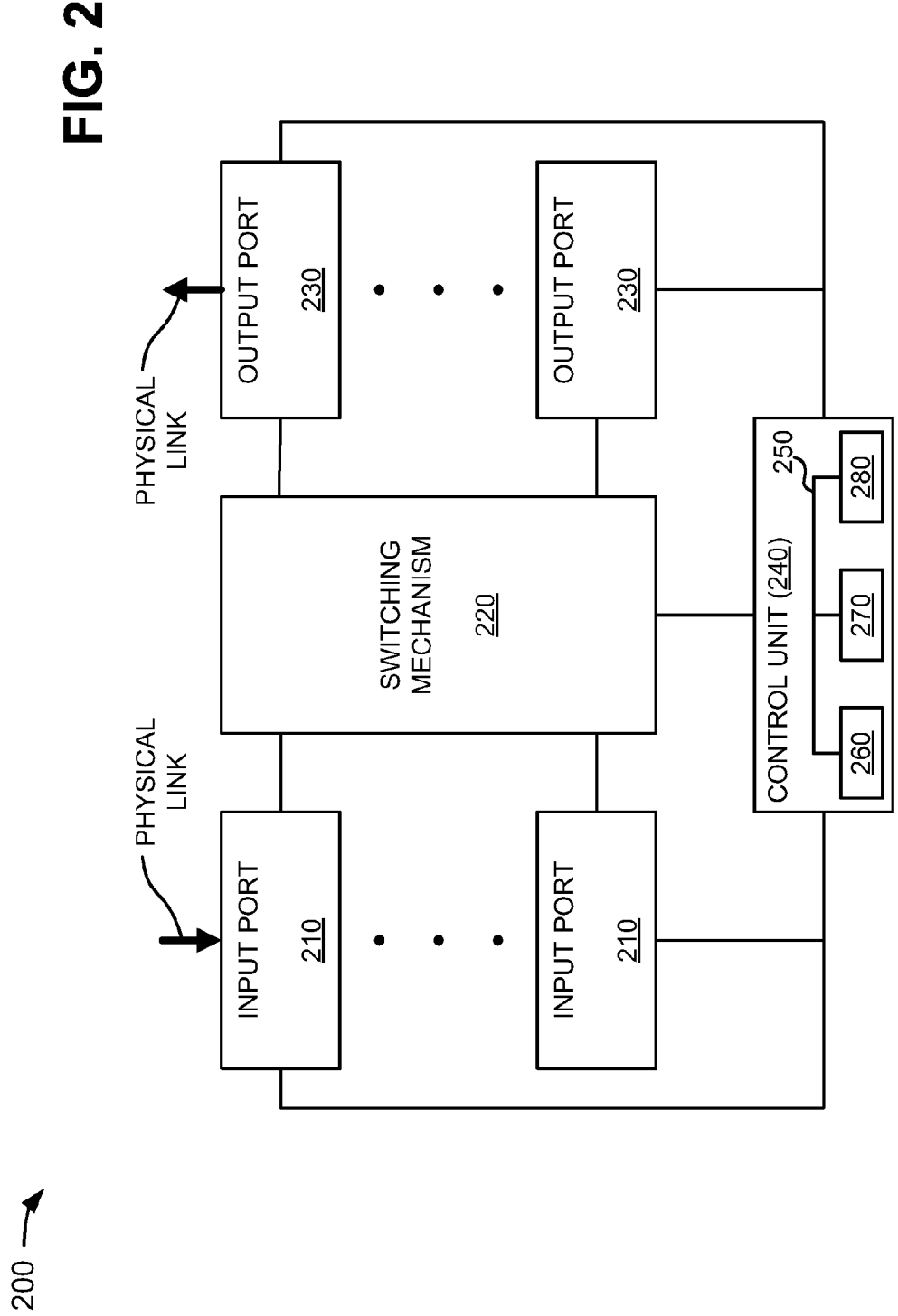
FIG. 2 is a diagram of example components of a network device depicted in FIG. 1.

FIG. 2 is a diagram of example components of a device 200 that may correspond to one of network devices 110 (FIG. 1). As shown, device 200 may include input ports 210, a switching mechanism 220, output ports 230, and a control unit 240.

Input ports 210 may be a point of attachment for physical links and may be a point of entry for incoming traffic (e.g., packets). Input ports 210 may carry out data link layer encapsulation and decapsulation. In example implementations, input ports 210 may send (e.g., may be an exit point) and/or receive (e.g., may be an entry point) packets.

Switching mechanism 220 may interconnect input ports 210 with output ports 230. Switching mechanism 220 may be implemented using many different techniques. For example, switching mechanism 220 may be implemented via busses, crossbars, and/or with shared memories (e.g., which may act as temporary buffers to store traffic from input ports 210 before the traffic is eventually scheduled for delivery to output ports 230).

Output ports 230 may store packets and may schedule packets for service on output links (e.g., physical links). Output ports 230 may include scheduling algorithms that support priorities and guarantees. Output ports 230 may support data link layer encapsulation and decapsulation, and/or a variety of higher-level protocols. In an example implementations, output ports 230 may send packets (e.g., may be an exit point) and/or receive packets (e.g., may be an entry point).

Control unit 240 may use routing protocols and one or more forwarding tables for forwarding packets. Control unit 240 may connect with input ports 210, switching mechanism 220, and output ports 230. Control unit 240 may compute a forwarding table, implement routing protocols, and/or run software to configure and manage device 200. Control unit 240 may handle any packet whose destination address may not be found in the forwarding table.

In an example implementation, control unit 240 may include a bus 250 that may include a path that permits communication among a processor 260, a memory 270, and a communication interface 280. Processor 260 may include one or more processors, microprocessors, ASICs, FPGAs, or other types of processing units that may interpret and execute instructions. Memory 270 may include a RAM, a ROM device, a magnetic and/or optical recording medium and its corresponding drive, and/or another type of static and/or dynamic storage device that may store information and instructions for execution by processor 260. Memory 270 may also temporarily store incoming traffic (e.g., a header of a packet or an entire packet) from input ports 210, for processing by processor 260, before a packet is directed back to the shared memories (e.g., in switching mechanism 220), queued in the shared memories (e.g., based on processing results), and eventually scheduled to be sent to output ports 230. Communication interface 280 may include any transceiver-like mechanism that enables control unit 240 to communicate with other devices and/or systems.

Device 200 may perform certain operations, as described herein. Device 200 may perform these operations in response to processor 260 executing software instructions contained in a computer-readable medium, such as memory 270. A computer-readable medium may be defined as a non-transitory memory device. A memory device may include space within a single physical memory device or spread across multiple physical memory devices. The software instructions may be read into memory 270 from another computer-readable medium, such as a data storage device, or from another device via communication interface 280. The software instructions contained in memory 270 may cause processor 260 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
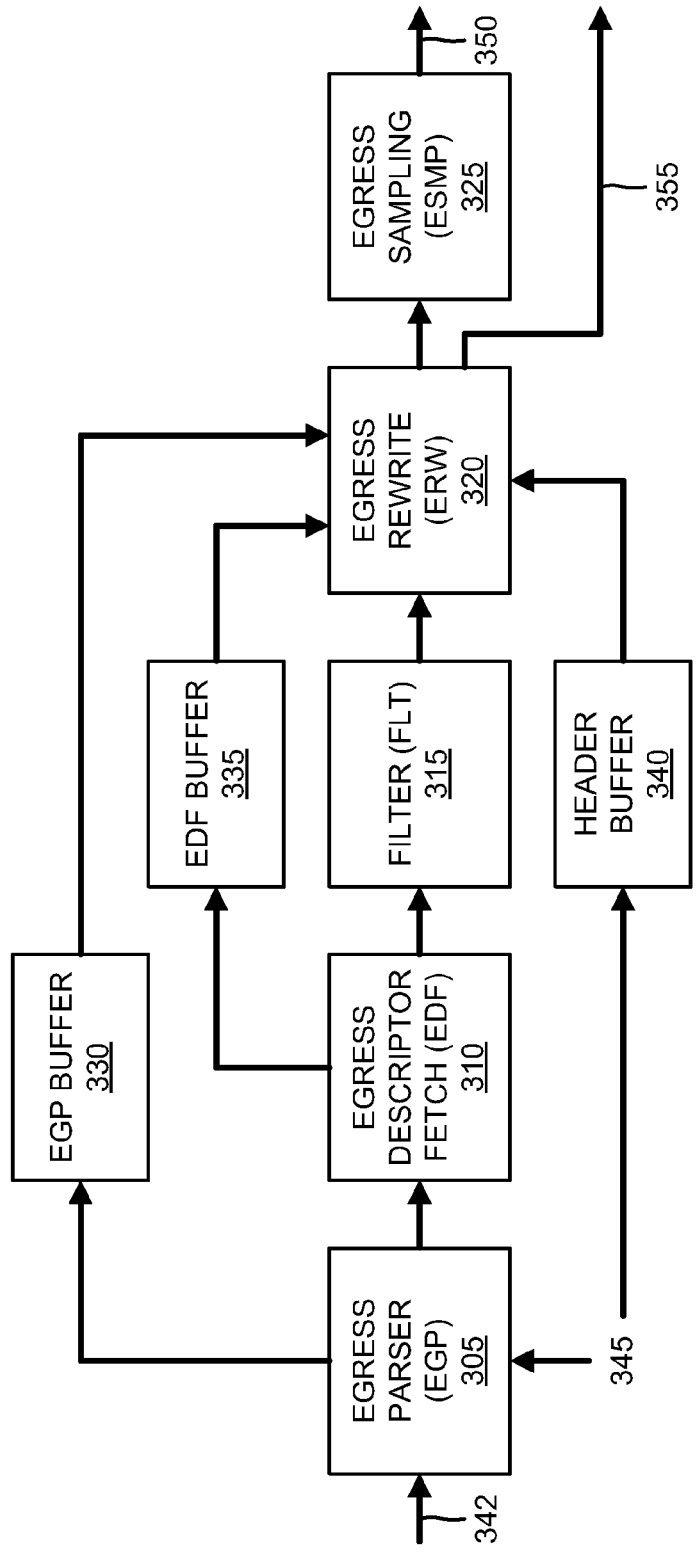
FIG. 3 is a diagram of example functional components of the network device illustrated in FIG. 2.

FIG. 3 is a diagram of example functional components of network device 110. In one example, the functions described in connection with FIG. 3 may be performed by one or more components (e.g., input ports 210 or output ports 230) of device 200 (FIG. 2). In one implementation, FIG. 3 may depict functional components of an egress packet processor (EPP) 300 of network device 110. EPP 300 may receive packets traveling to a new destination of a network (e.g., network 120) and may set Layer 2 and Layer 3 headers (e.g., for the packets) to appropriate protocol fields in order to correctly deliver the packets. Besides adding headers to packets, EPP 300 may also modify type of service (TOS) fields, time to live (TTL) fields, etc. of the packets (e.g., so that the packets are properly handled by other network devices 110). As shown in FIG. 3, EPP 300 may include an egress parser (EGP) component 305, an egress descriptor fetch (EDF) component 310, a filter (FLT) component 315, an egress rewrite (ERW) component 320, an egress sampling (ESMP) component 325, an EGP buffer component 330, an EDF buffer component 335, and a header buffer component 340.

EGP 305 may include hardware or a combination of hardware and software that may receive a packet, and may parse a packet into components (e.g., headers, payload, etc.). EGP 305 may analyze the parsed packet to determine a type of packet. As shown in FIG. 3, EGP 305 may receive a notification 342 and headers 345 (e.g., original headers) associated with a packet, and may parse headers 345. EGP 305 may provide notification 342 to EDF 310 and may provide parsed headers 345 to EDF 310 and/or EGP buffer 330. The term "notification," as used herein, is intended to be broadly construed to include commands and data that are a result of processing (e.g., an EDF notification may be a result of processing performed by EDF 310).

EDF 310 may include hardware or a combination of hardware and software that may receive notification 342 and/or parsed headers 345 from EGP 305, and may provide notification 342 to filter 315. EDF 310 may determine output packet fields for the packet, and may provide this information to EDF buffer 335 and/or filter 315.

Filter 315 may include hardware or a combination of hardware and software that may receive notification 342 and the output packet fields from EDF 310, and may modify (e.g., add, drop, etc.) the output packet fields. Filter 315 may provide the modified packet fields and notification 342 to ERW 320.

ERW 320 may include hardware or a combination of hardware and software that may receive the modified packet fields and notification 342 from filter 315, and may receive parsed headers 345 from EGP buffer 330. ERW 320 may receive the output packet fields from EDF buffer 335, and may receive headers 345 from header buffer 340. ERW 320 may utilize the received information to create new headers for the packet, to change specific fields of original headers of the packet, and transfer the results to ESMP 325 and to an output queue manager (OQM), as indicated by reference number 355. ERW 320 may support creation of Layer 2 and Layer 3 protocol headers (e.g., Ethernet, Layer 2 tagging, Multiprotocol Label Switching (MPLS), IPv4, IPv6, etc. protocol headers) in egress packets. ERW 320 may support software-programmable templates for encapsulation rules, as well as flexible, table-driven quality of service (QoS)-mapping for rewrite functions. Further details of ERW 320 are provided below in connection with, for example, one or more of FIGS. 4-11.

In one example implementation, a forwarding decision for the packet may have been prior to the packet's arrival at ERW 320. Based on the forwarding decision, ERW 320 may determine a protocol template for the packet header. Once the packet is encapsulated with appropriate protocol header bytes (e.g., obtained via the template), the output destination of the packet may be known from the forwarding decision (e.g., from indications provided an upstream component). The packet may then be transmitted to a forwarding destination on a respective line interface of network device 110.

ESMP 325 may include hardware or a combination of hardware and software that may receive notification 342, any newly created headers for the packet, and any changed original headers of the packet from ERW 320. ESMP 325 may decide whether to make copies of the packet, and may provide notification 342, any newly created headers or changed original headers of the packet, and the decision on whether to make copies of the packet to other components of network device 110, as indicated by reference number 350.

EGP buffer 330 may include hardware or a combination of hardware and software that may receive parsed headers 345 from EGP 305, and may provide parsed headers 345 to ERW 320. EDF buffer 335 may include hardware or a combination of hardware and software that may receive output packet fields for the packet from EDF 310, and may provide this information to ERW 320. Header buffer 340 may include hardware or a combination of hardware and software that may receive headers 345 and may provide headers 345 to ERW 320. Each of buffers 330-345 may store the aforementioned information for a predetermined amount of time before providing the information to ERW 320. Alternatively, or additionally, each of buffers 330-345 may store the aforementioned information until ERW 320 requests the information.

Although FIG. 3 shows example functional components of EPP 300, in other implementations, EPP 300 may include fewer functional components, different functional components, differently arranged functional components, or additional functional components than depicted in FIG. 3. Alternatively, or additionally, one or more functional components of EPP 300 may perform one or more other tasks described as being performed by one or more other functional components of EPP 300.

Figure 4:
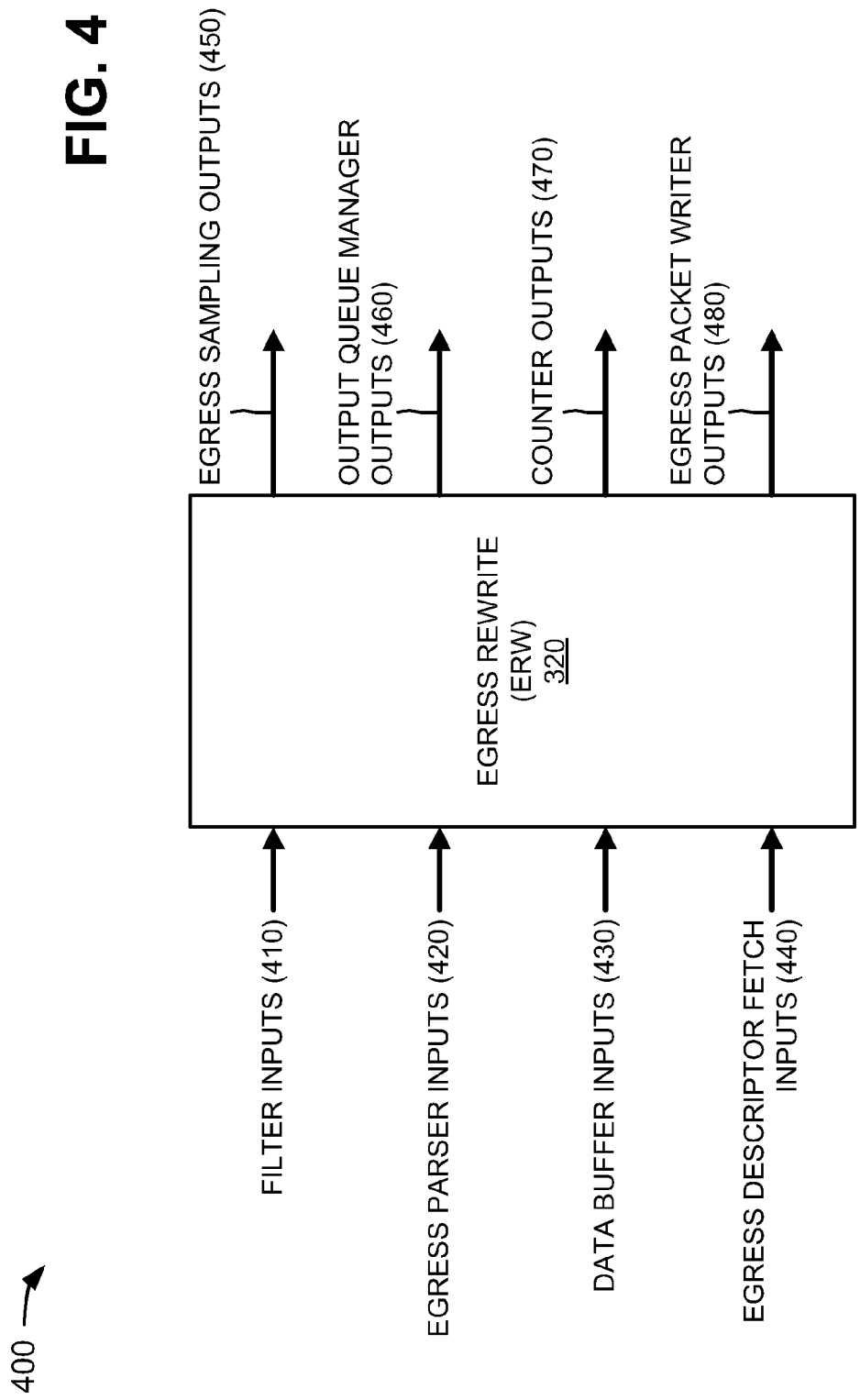
FIG. 4 is a diagram of example inputs and outputs of an egress rewrite component depicted in FIG. 3.

FIG. 4 is a diagram of example inputs and outputs 400 of ERW 320. In one implementation, ERW 320 may include interfaces for receiving inputs and interfaces for transmitting outputs. As shown in FIG. 4, ERW 320 may receive filter inputs 410, egress parser inputs 420, data buffer inputs 430, and egress descriptor fetch inputs 440. As further shown in FIG. 4, ERW 320 may generate egress sampling outputs 450, output queue manager outputs 460, counter outputs 470, and egress packet writer outputs 480.

Filter inputs 410 may include packet keys and notifications received from filter 315 (FIG. 3).

Egress parser inputs 420 may include information fields provided by EGP 305 (FIG. 3) that are not required by EDF 310 or filter 315 (FIG. 3). In one example, egress parser inputs 420 may include information fields, such as Layer 2 buffer fields. Egress parser inputs 420 may bypass EDF 310 and filter 315 by being provided to ERW 320 via EGP buffer 330.

Data buffer inputs 430 may include a header cell received from a data buffer memory (e.g., of network device 110) and stored in an internal header buffer memory.

Egress descriptor fetch inputs 440 may include information provided by EDF 310 (FIG. 3) that is not required by filter 315 (FIG. 3). Egress descriptor fetch inputs 440 may bypass filter 315 by being provided to ERW 320 via EDF buffer 335. EDF buffer 335 may store egress descriptor fetch inputs 440, and ERW 320 may retrieve egress descriptor fetch inputs 440 when notification 342 is received from filter 315. In one implementation, egress descriptor fetch inputs 440 may include information fields that are provided from EDF 310 to both filter 315 and ERW 320 (e.g., for reducing top level routing wires).

Egress sampling outputs 450 may include a small form of notification 342 and may be provided to ESMP 325 (FIG. 3) after processing a packet. In one example, packets flowing in ERW 320 may be transmitted to ESMP 325 without direct flow control. Egress sampling may include a command that contains a set of sampling classes and indicates that a packet is eligible for a sampling decision for each included sampling class. If the sampling decision is true, a copy of the packet may be made and forwarded according to a configuration programmed per sampling class.

Output queue manager outputs 460 may include a new header for a packet, a service header for the packet, and notification 342. In one example, output queue manager outputs 460 may be transmitted to an output queue manager without direct flow control.

Counter outputs 470 may include updates to one or more counters associated with ERW 320.

Egress packet writer outputs 480 may include a pointer associated with a header cell read out of the header buffer memory (e.g., header buffer 340). When the header cell is read out of the header buffer memory, the associated pointer may be de-allocated by sending the pointer to an egress packet writer (EPW) along with a request.

Although FIG. 4 shows example inputs and outputs of ERW 320, in other implementations, ERW 320 may include fewer inputs and/or outputs, different inputs and/or outputs, or additional inputs and/or outputs than depicted in FIG. 4.

Figure 5:
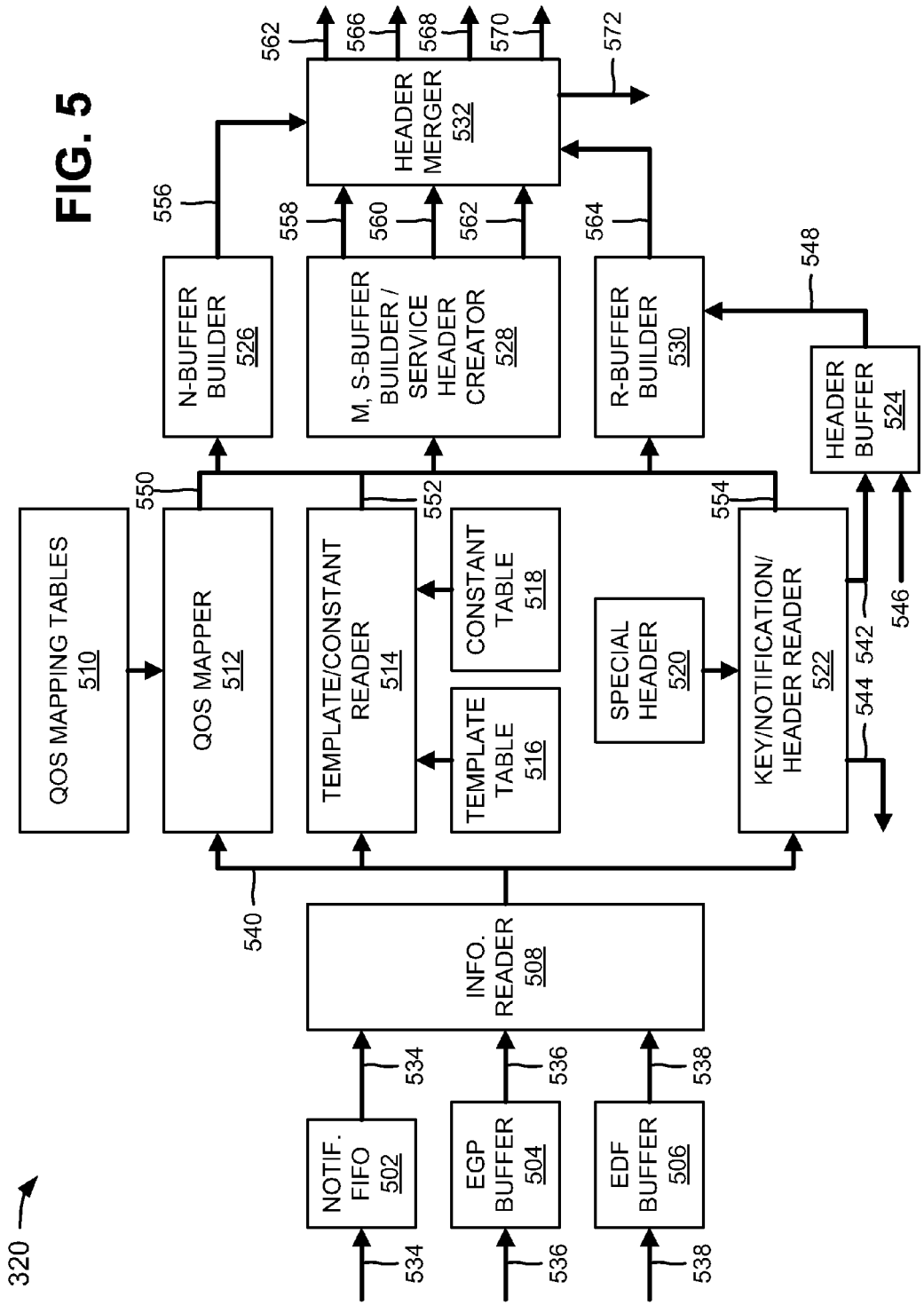
FIG. 5 is a diagram of example functional components of the egress rewrite component depicted in FIGS. 3 and 4.

FIG. 5 is a diagram of example functional components of ERW 320. In one implementation, the functions described in connection with FIG. 5 may be performed by one or more components (e.g., provided in input ports 210 or output ports 230) of device 200 (FIG. 2). As illustrated in FIG. 5, ERW 320 may include a notification first-in first-out (FIFO) queue 502, an EGP buffer 504, an EDF buffer 506, a information reader 508, QoS mapping tables 510, a QoS mapper 512, a template/constant reader 514, a template table 516, a constant table 518, a special header 520, a key/notification/header reader 522, a header buffer 524, a new (N)-buffer builder 526, a MPLS (M), special headers (S)-buffer builder/service header creator 528, a rewrite (R)-buffer builder 530, and a header merger 532.

In one example implementation, ERW 320 may include an information collection stage, a preparation stage, and a header build stage. Notification FIFO 502, EGP buffer 504, EDF buffer 506, and information reader 508 may make up the information collection stage. QoS mapping tables 510, QoS mapper 512, template/constant reader 514, template table 516, constant table 518, special header 520, key/notification/header reader 522, and header buffer 524 may make up the preparation stage. N-buffer builder 526, M, S-buffer builder/service header creator 528, R-buffer builder 530, and header merger 532 may make up the header build stage.

In the information collection stage, ERW 320 may receive a notification from filter 315 (FIG. 3). Filter 315 may send a notification every clock cycle to ERW 320. However, if a processing rate of ERW 320 is once every four clock cycles, a FIFO queue (e.g., notification FIFO 502) may be used to absorb the notifications. Every four clock cycles, information reader 508 may read a notification from notification FIFO 502. After reading the notification, information reader 508 may read bypass information provided by EGP buffer 504 and EDF buffer 506. The bypass information and the notification (e.g., read by information reader 508) may contain various parameters and data values that may be used to form output header stacks.

The bypass information and the notification collected by the components of the information collection stage may be passed to the components of the preparation stage. QoS mapping, template decoding, and special header processing may be performed in the preparation stage. Template/constant reader 514 may use a template index (e.g., provided in the notification) to read template table 516. Template/constant reader 514 may interpret mnemonics programmed in the template index, and may generate information to be used in the header build stage. At the same time (e.g., in parallel), QoS mapper 512 may use fields provided in the notification and QOS mapping tables 510 to derive class-rewrite information for Layer 2, Layer 3 and MPLS. Key/notification/header reader 522 (e.g., in parallel) may read special header 520, and related control information, using the EDF notification. The information generated by QoS mapper 512, template/constant reader 514, and Key/notification/header reader 522 may be sent to components of the header build stage.

The header build stage may include three parallel processes: a Layer 2 header build process (e.g., by N-buffer builder 526), a MPLS/Service Header/Special Header build process (e.g., by M, S-buffer builder/service header creator 528), and Layer 3 rewrite process (e.g., by R-buffer builder 530). These three parallel processes may produce an N-buffer, an M-buffer, an S-buffer, a service header, and an R-buffer. Header merger 532 may merge the N-buffer, the M-buffer, the S-buffer, and the R-buffer in a predetermined way specified for the packet, and may provide the merged buffers as a new header to an OQM, along with the notification and the service header. Header merger 532 may also provide a small form of the notification (e.g., enough to do sampling decision) to ESMP 325.

Notification FIFO 502 may include hardware or a combination of hardware and software that may interface with filter 315 (FIG. 3), and may receive a notification 534 (e.g., associated with a packet) from filter 315. In one example, notification 534 may correspond to notification 342. Each entry in notification FIFO 502 may include a notification of a packet. Notification FIFO 502 may be read (e.g., by information reader 508) once every four clock cycles, and notification 534 may be provided to information reader 508. In one implementation, reading from notification FIFO 502 may be controlled by an availability of credits to ESMP 325. The available credits may be decremented when notification FIFO 502 is read, and the available credits may be incremented when ESMP 325 returns a credit.

EGP buffer 504 may include hardware or a combination of hardware and software that may receive packet information 536 (e.g., at a different time than packet information 538 is received by EDF buffer 506) from EGP 305 when a corresponding notification is received from filter 315. EGP buffer 504 may store packet information 536 (e.g., EGP bypass information that contains fields, such as opaque tags, L2L headers, etc.) in an index. In one example implementation, EGP buffer 504 may correspond to EGP buffer 330. Information reader 508 may retrieve packet information 536 from EGP buffer 504 after notification 534 is read from notification FIFO 502.

EDF buffer 506 may include hardware or a combination of hardware and software that may receive packet information 538 (e.g., at a different time than packet information 536 is received by EGP buffer 504) from EDF 310 when a corresponding notification is received from filter 315. EDF buffer 506 may store packet information 538 (e.g., EDF bypass information that contains fields, such as key buffer fields, MPLS tags, control information, etc.) in an index. In one example implementation, EDF buffer 506 may correspond to EDF buffer 335. Information reader 508 may retrieve packet information 538 from EDF buffer 506 after notification 534 is read from notification FIFO 502.

Information reader 508 may include hardware or a combination of hardware and software that may receive notification 534 from notification FIFO 502. Every four clock cycles, information reader 508 may read a notification from notification FIFO 502. Based on receipt of notification 534, information reader 508 may retrieve packet information 536 from EGP buffer 504 and may retrieve packet information 538 from EDF buffer 506. Packet information 536/538 and notification 534 (e.g., read by information reader 508) may contain various parameters and data values 540 that may be used to form output header stacks. Information reader 508 may provide parameters/data values 540 to QoS mapper 512, template/constant reader 514, and key/notification/header reader 522.

QoS mapping tables 510 may include hardware or a combination of hardware and software that may provide mapping tables for each of Layer 2, IPv4, IPv6, FC, and MPLS. QoS mapping tables 510 may include rewrite enable information, trap enable information, rewrite value information, and congestion encountered (CE) mark information. For Layer 2 and MPLS, the rewrite enable information (e.g., a rewrite value) may be used to overwrite a corresponding field in an output header. For Layer 3, the rewrite value may be use to overwrite a corresponding field in a Layer 3 header when control bits in an EDF notification are set. If a packet is trapped, the trap enable information (e.g., a trapcode value) may be set from programmable registers for the packet. There may be separately programmable trapcode value registers for Layer 2, MPLS, IPv4, IPv6, and FC. The rewrite value information may include different values for Layer 2, Layer 3, MPLS, IPv4, IPv6, and FC. The CE mark information may indicate if a rewrite value carries Explicit Congestion Notification (ECN) information overloaded.

QoS mapper 512 may include hardware or a combination of hardware and software that may receive parameters/data values 540, and may determine QoS mapping parameters 550 from parameters/data values 540. For example, QoS mapper 512 may determine QoS mapping parameters 550, such as QoS mapping indices corresponding to inner and outer virtual LAN (VLAN) tags (e.g., Layer QIX0, QIX1); a Layer 3 QoS mapping index (e.g., Layer 3 QIX); and QoS mapping indices corresponding to MPLS push labels (e.g., MPLS QIX0-5). In one example, QoS mapper 512 may implement the logic described in Table 1 (below) in order to determine QoS mapping parameters 550.

TABLE 1

| Qix | Range | Meaning | Comments |
|---|---|---|---|
| l2_qix0, l2_qix1 | 0 to 0 × 3F | Read layer2 qosrw mapping table | Table may give the following information:<br>rw_en (Rewrite enable)<br>rw_val (Rewrite value)<br>trap_en (Trap enable)<br>ce_mark (CE mark indication) |
|  | 0 × 40 to 0 × 4F | Get immediate value of {PRI, DE} from QIX[3:0] | The following may be implicit:<br>rw_en = 1<br>trap_en = 0<br>ce_mark = 0 |
|  | 0 × 7F | Rewrite disable | |
|  | Outside the above ranges | Illegal. Packet may be trapped as 'illegal qix' | |
| mpls_qix 0-5 | 0 to 0 × 3F | Read MPLS qosrw mapping table | Table may give the following information:<br>rw_en (Rewrite enable)<br>rw_val (Rewrite value)<br>trap_en (Trap enable)<br>ce_mark (CE mark indication) |

TABLE 1-continued

| Qix | Range | Meaning | Comments |
|---|---|---|---|
| | 0 × 40 to 0 × 47 | Get immediate value of EXP from QIX[2:0] | The following may be implicit: rw_en = 1 trap_en = 0 ce_mark = 0 |
| | 0 × 7F Outside the above ranges | Rewrite disable Illegal. Packet is trapped as 'illegal qix' | |
| l3_qix with l3_type == IPV4, IPV6 | 0 to 0 × 3F | Read Layer3 qosrw mapping table | Table may give the following information: rw_en (Rewrite enable) rw_val (Rewrite value) trap_en (Trap enable) ce_mark (CE mark indication) |
| | 0 × 80 to 0 × BF | Get immediate value for DSCP from QIX[5:0] | The following may be implicit: rw_en = 1 trap_en = 0 ce_mark = 0 |
| | 0 × FF Outside the above ranges | Rewrite disable Illegal Qix. Packet trapped | |
| l3_qix with l3_type == MPLS, MPLS_MC | 0 to 0 × 3F | Read MPLS qosrw mapping table | Table may give the following information: rw_en (Rewrite enable) rw_val (Rewrite value) trap_en (Trap enable) ce_mark (CE mark indication) |
| | 0 × 80 to 0 × 87 | Get immediate value for EXP from QIX[2:0] | The following may be implicit: rw_en = 1 trap_en = 0 ce_mark = 0 |
| | 0 × FF Outside the above ranges | Rewrite disable Illegal Qix. Packet trapped | |
| l3_qix with, l3_type == FC | 0 to 0 × 3F | Read Layer3 qosrw mapping table | Table may give the following information: rw_en (Rewrite enable) rw_val (Rewrite value) trap_en (Trap enable) ce_mark (CE mark indication) |
| | 0 × 80 to 0 × 87 | Get immediate value for VFT-Pri from QIX[2:0] | The following may be implicit: rw_en = 1 trap_en = 0 ce_mark = 0 |
| | 0 × FF Outside the above ranges | Rewrite disable Illegal Qix. Packet will be trapped | |
| l3_qix with l3_type not any of the above | | Rewrite disabled | |

Depending on the QIX value provided in parameters/data values 540, QoS mapper 512 may either obtain QoS mapping parameters 550 (e.g., a rewrite value) from the QIX value itself or by looking up the rewrite value from one of QoS mapping tables 510. If QoS mapping parameters 550 are obtained from QoS mapping tables 510, QoS mapping parameters 550 may include the rewrite enable information, the trap enable information, the rewrite value information, and/or the CE mark information. As further shown in FIG. 5, QoS mapper 512 may provide QoS mapping parameters 550 to N-buffer builder 526, M, S-buffer builder/service header creator 528, and R-buffer builder 530.

Template/constant reader 514 may include hardware or a combination of hardware and software that may receive parameters/data values 540, and may select a particular template from template table 516 for the packet based on parameters/data values 540. Template/constant reader 514 may decode mnemonics of the particular template to determine protocol bytes 552 for sub-headers of the packet. In one example, a notification associated with parameters/data values 540 may include an ERW Template Index (TIX), and template/constant reader 514 may use the ERW TIX to select encapsulation template information (e.g., a particular template) from template table 516. The encapsulation template information may include a set of enumerated mnemonics (e.g., encoded values) programmed in a specific sequence that indicates how an outgoing packet header should look. The enumerated values may represent Layer 2 or Layer 3 protocols. In some implementations, the enumerated value may be a direct pointer to constant table 518, from which encapsulation data may be obtained. The two types of fields (e.g., an enumerated value or a pointer) may be distinguished by looking at a bit in the field.

Figure 6:
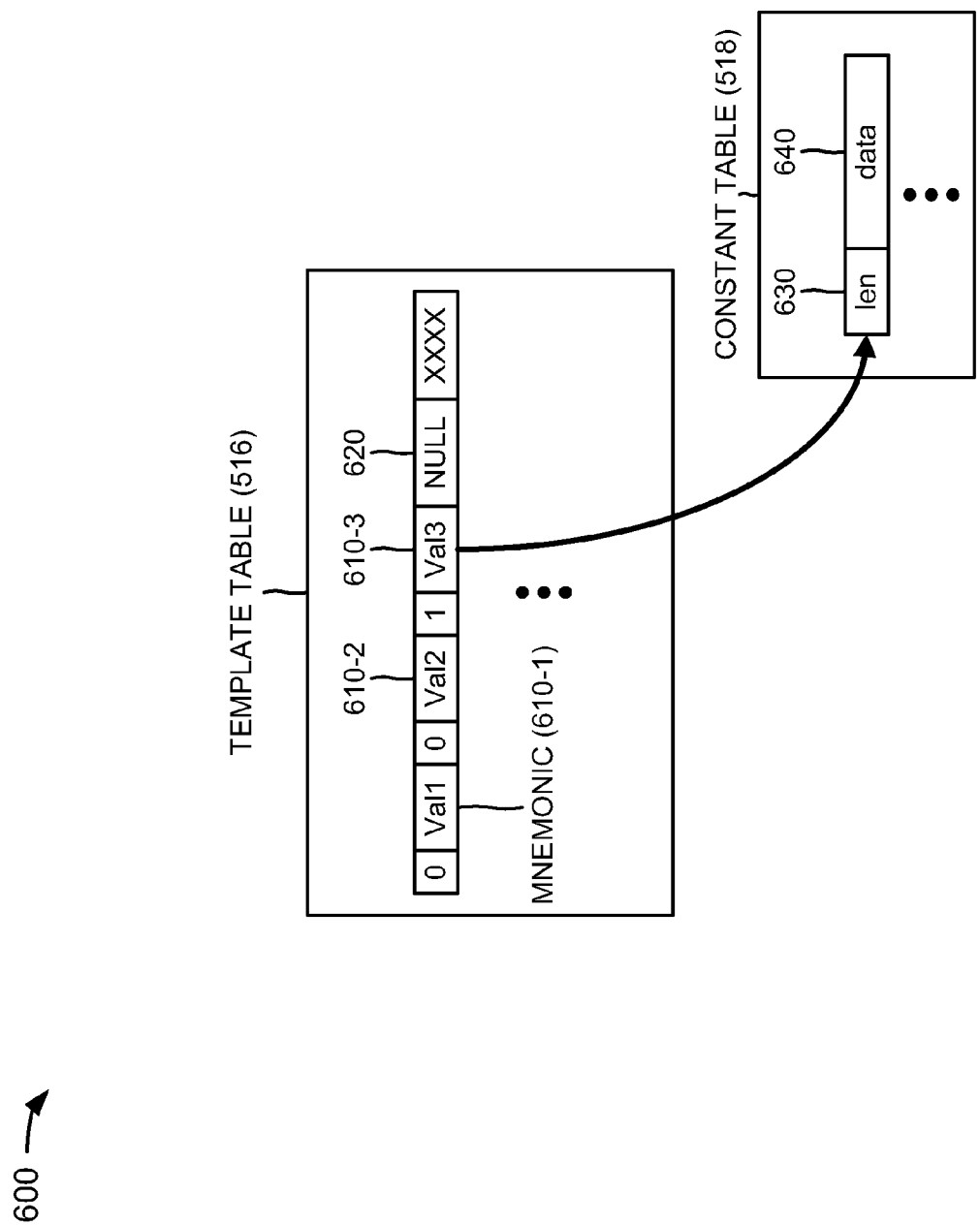
FIG. 6 is a diagram of example interactions between a template table and a constant table illustrated in FIG. 5.

FIG. 6 is a diagram of example interactions 600 between template table 516 and constant table 518. As shown, template table 516 may include enumerated value mnemonics 610-1, 610-2, and 610-3, and an end of headers (or NULL) mnemonic 620. Mnemonics 610-1, 610-2, and 610-3 may include enumerated values referring to protocol headers or a pointer to intermediate data provided in constant table 518. In the example shown in FIG. 6, mnemonics 610-1 and 610-2 may include enumerated values referring to protocol headers, while mnemonic 610-3 may include a pointer to intermediate data (e.g., in data field 640) provided in constant table 518.

NULL mnemonic 620 may mark the end of headers. A list of example mnemonics that may be provided in template table 516 is provided below in Table 2. In this table, certain mnemonics may be marked as "unconditional" or "conditional." When an unconditional mnemonic is processed, header bytes corresponding to that mnemonic may be inserted into the output header with any further qualifications. When a conditional mnemonic is processed, header bytes corresponding to that mnemonic may be inserted into the output header if a respective valid flag is set in the EDF notification.

Returning to FIG. 5, after selecting the particular template from template table 516, for the packet, template/constant reader 514 may decode and execute the mnemonics of the particular template to determine protocol bytes 552 for sub-headers of the packet. Template/constant reader 514 may locate a NULL mnemonic in the particular template and may extract all valid mnemonics before the NULL mnemonic. If a NULL mnemonic is not present in the particular template, all mnemonics in the particular template may be valid. Template/constant reader 514 may pre-process each mnemonic and

TABLE 2

| Mnemonic | Meaning | Possible New Bytes Created | Comments |
| --- | --- | --- | --- |
| ETH | Ethernet Base Header (Unconditional) | 12B | {DA, SA}<br>DA and SA may be obtained from Key buffer. |
| VLAN | VLAN tag (Conditional) | 0, 4B, 8B | May cause insertion of zero, one, or two Vlan Tags. Each VLAN tag may include the following format: { EtherType, PRI[2:0], DE, VID[11:0] } Vlan ID for the two tags may be extracted from the Key buffer. The Key buffer fields may have a 'valid' bit for each of them. Number of Vlan tags created in the output pkt may be dependent on how many valid bits are set in the Key buffer. If none of the valid bits are set in the Key buffer then no tags may be inserted. PRI[2:0] and DE for the tags may be set based on QoS-mapping result.<br>Tag Ethertype derivation:<br>EDF may pass a 4-bit Ethertype-select in the notification. This may be used to access a table containing 16-bit ethertype values corresponding to the two tags. |
| OPAQ_TAG | Pass through Opaque tags (Conditional) | 0 to 16B | Opaque tags that may be preserved from the input packet. Up to 16 bytes of tag information can be carried over. This information may be passed from EGP to ERW. Number of bytes may be indicated through passthru_tag_bcnt in the notification. |
| CN_TAG | Congestion Notification TAG (Conditional) | 0, 4B | {ETHERTYPE, QCN_ID}. qcn_id may be obtained from EDF. Ethertype may be obtained from a programmable register. |
| DLPORT_TAG | Destination Lport_info TAG (Unconditional) | 4B | {ETHERTYPE, DST_LPORT_INFO}. dst_lport_info may be obtained from EDF. Ethertype may be obtained from a programmable register. |
| ELENGTH | 802.3 Length field (Unconditional) | 2B | 802.3 Length field may be computed and inserted. |
| L3_ETYP | Layer3 ethertype (Unconditional) | 2B | This is the layer3 ethertype. |
| CNSTD_PTR (pointer value) | Pointer to Constant Data Table (Conditional) | 0-16B (variable) | The contents of the memory may contain a size field and a number of bytes. Size field may indicate a number of valid bytes. Those bytes may be inserted in the header at the position given by the position of this mnemonic in the template. |
| NULL | End of Headers | 0 | This may mark the end of headers where the ERW may stop looking further. |

As further shown in FIG. 6, constant table 518 may include a length (len) field 630 that indicates a number of valid bytes, and data field 640 that includes data to be read. Constant table 518 data may be read if a mnemonic of a template has a pointer to constant table 518, and the data may be inserted into the packet header. For example, as shown in FIG. 6, mnemonic 610-3 of the template may have a pointer to length field 630 and data field 640 of constant table 518.

Although FIG. 6 shows example interactions 600 between template table 516 and constant table 518, in other implementations, template table 516 and constant table 518 may include fewer interactions, different interactions, or additional interactions than depicted in FIG. 6. Furthermore, template table 516 and/or constant table 518 may include less information, different information, differently arranged information, or additional information than depicted in FIG. 6.

may resolve conditional mnemonics with respective fields in the notification. As further shown in FIG. 5, template/constant reader 514 may provide protocol bytes 552 for sub-headers of the packet to N-buffer builder 526, M, S-buffer builder/service header creator 528, and R-buffer builder 530.

Special header 520 may include hardware or a combination of hardware and software that may store software managed constants that are indexed by a "sphix" parameter received from EDF 310. Special header 520 may include the following example fields: a valid field (e.g., that may indicate if remaining information is valid); a byte count field (e.g., that may indicate how many valid data bytes are programmed in a data field); a data field (e.g., that may indicate header data bytes); a buffer template field (e.g., that may specify a sequence of N, M, and S buffers in a new output header); a data Layer 3 type field (e.g., that may indicate if there is Layer 3 information at leading byte positions in the data field); and a command bits field (e.g., that may provide a set of bits for controlling hardware actions when handling the data field).

Key/notification/header reader 522 may include hardware or a combination of hardware and software that may receive parameters/data values 540 and information contained in special header 520. Key/notification/header reader 522 may read the information contained in special header 520, and may interpret the buffer template field and the command bits field. If the valid field is "0," key/notification/header reader 522 may ignore remaining information (e.g., including the buffer template field) and may maintain an order of the buffer stack as {N, M, R}. The buffer template field may include the example settings set forth in Table 3 (below), and, based on the setting, key/notification/header reader 522 may generate control signals that may be used in the header build stage. The R-buffer may be the last (innermost) buffer in the buffer stack, so it may be omitted from the buffer template mnemonics.

N-buffer builder 526, M, S-buffer builder/service header creator 528, and R-buffer builder 530. Key/notification/header reader 522 may provide information 542 (e.g., read from special header 520) to header buffer 524, and may de-allocate header buffers, as indicated by reference number 544.

Header buffer 524 may include hardware or a combination of hardware and software that may receive information 542 from key/notification/header reader 522, and may receive a packet header cell 546 (e.g., at a different time than packet information 536 is received by EGP buffer 504 and packet information 538 is received by EDF buffer 506). Header buffer 524 may store information 542 and packet header cell 546 in an index. In one example implementation, header buffer 524 may correspond to header buffer 340. R-buffer builder 530 may retrieve information 548 (e.g., information 542 and packet header cell 546) from header buffer 524.

TABLE 3

| Buffer template setting | What it means to headerbuild | Comments |
| --- | --- | --- |
| {N, M, S} | ELENGTH in N-buffer may include M, S-buffer lengths. L3_ETYP in N-buffer may be with respect to M-buffer if mpls_lbl_cnt=0. If mpls_lbl_cn==0 & S_buffer_bcnt=0, then it may be with respect to data _l3_type, else it may be with respect to R-buffer l3_type. IPv4 header total packet length in S-buffer may include itself and entire packet length starting from R-buffer until a byte before ICRC. | |
| {N, S, M} | ELENGTH in N-buffer may include M, S-buffer lengths. L3_ETYP in N-buffer may be with respect to data_l3_type if S_buffer_bcnt=0. Otherwise may be with respect to MPLS. IPv4 header total packet length in S-buffer may include itself and entire packet length starting from M-buffer until the byte before ICRC. | |
| {S, M, N} | L3_ETYP in N-buffer may be with respect to R-buffer l3_type | S-buffer may not have ipv4_assist. |
| {S, N, M} | L3_ETYP in N-buffer may be with respect to MPLS if mpls_lbl_cnt!=0. Otherwise it may be with respect to R-buffer l3_type. | S-buffer may not have ipv4_assist. |
| {M, S, N} | L3_ETYP in N-buffer may be with respect to R-buffer l3_type | S-buffer may not have ipv4_assist. |
| {M, N, S} | L3_ETYP in N-buffer may be with respect to R-buffer data_l3_type if S_buffer_bcnt==0. Otherwise it may be with respect to data_l3_type. | |
| {NULL, NULL, NULL} | Invalid template. | |

Key/notification/header reader 522 may set the template to one of the settings listed above in Table 3. Settings such as {N, S, NULL}, where only N and S mnemonics are specified, may be ambiguous regarding the position of the M-buffer. Hence such combinations may be considered illegal. Key/notification/header reader 522 may configure the three mnemonics in the expected sequence. At the end of processing the information contained in special header 520, key/notification/header reader 522 may generate information bits 554, such as a buffer-after-N value (e.g., an encoded value that may indicate which buffer follows the N-buffer); a buffer-after-S value (e.g., an encoded value that may indicate which buffer follows the S-buffer); and buffer stackup information (e.g., that may indicate an order of the N, M, S, and R buffers). Key/notification/header reader 522 may provide information bits 554 to In the header build stage, different header buffers may be created in parallel. For example, N-buffer builder 526 may create an N-buffer 556 (e.g., based on a Layer 2 template); M, S-buffer builder/service header creator 528 may create an M-buffer 558 (e.g., a MPLS stack), an S-buffer 560 (e.g., a special header), and a service header 562; and R-buffer 530 may create an R-buffer 564 (e.g., Layer 3 data formed from header cell 546).

Figure 7:
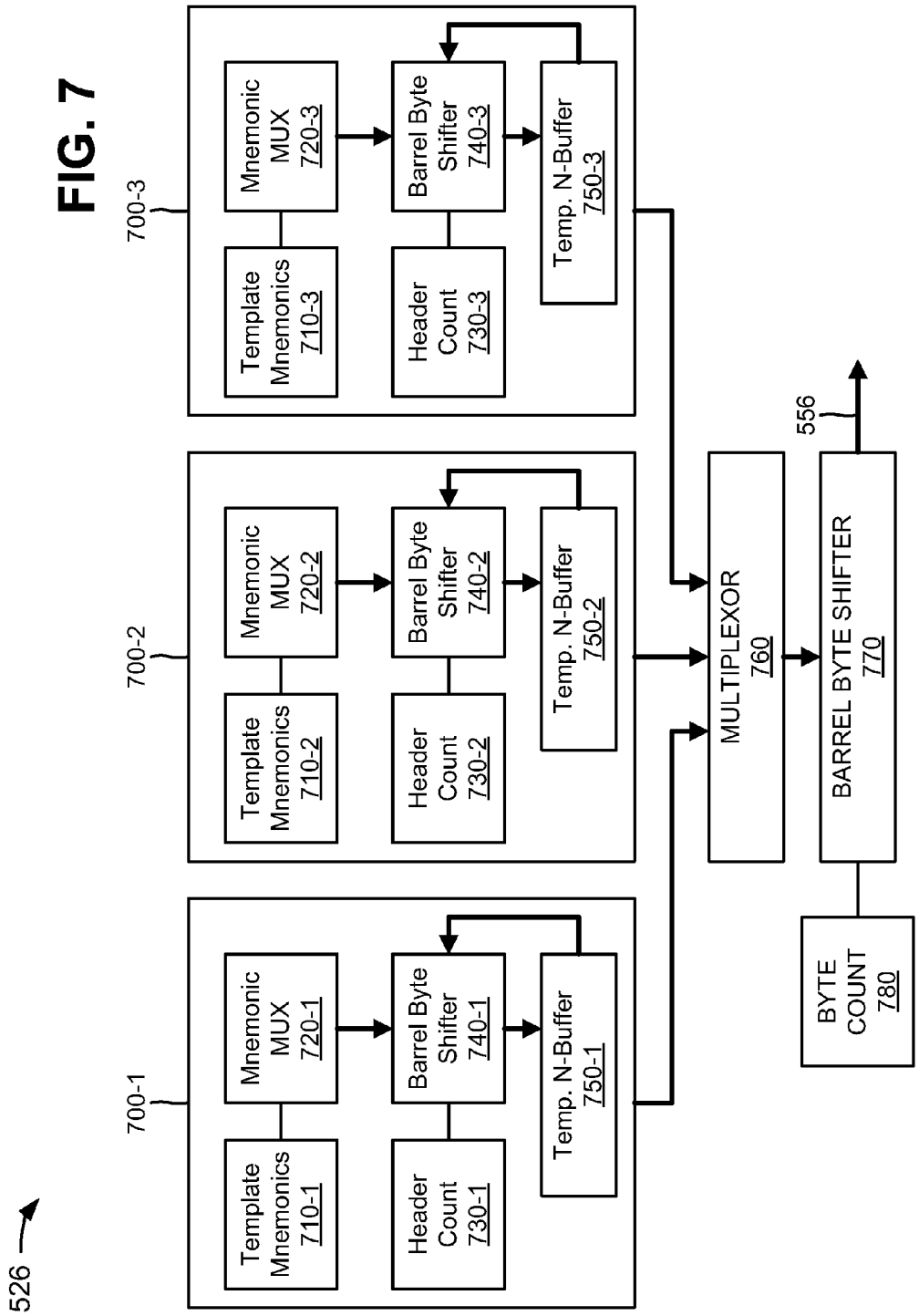
FIG. 7 is a diagram of example functional components of an N-buffer builder component depicted in FIG. 5.

N-buffer builder 526 may include hardware or a combination of hardware and software that may receive QoS mapping parameters 550, protocol bytes 552 for sub-headers of the packet, and information bits 554. N-buffer builder 526 may create N-buffer 556 based on the received information, and may provide N-buffer 556 to header merger 532. In one example implementation, headers that are defined by the selected particular template may be used by N-buffer builder 526 as building blocks to form N-buffer 556. For example, if the particular template includes "12" mnemonics, N-buffer builder 526 may utilize three parallel processing mechanisms to process the "12" mnemonics (e.g., with each processing mechanism handling "4" mnemonics). FIG. 7 depicts an example of this scenario.

FIG. 7 is a diagram of example functional components of N-buffer builder 526. In one implementation, the functions described in connection with FIG. 7 may be performed by one or more components (e.g., provided input ports 210 or output ports 230) of device 200 (FIG. 2). As illustrated in FIG. 7, N-buffer builder 526 may include three processing mechanisms 700-1, 700-2, and 700-3; a multiplexor 760; a barrel byte shifter 770; and a byte count 780. Processing mechanisms 700-2 and 700-3 may include the same features as processing mechanism 700-1. Therefore, only processing mechanism 700-1 is described below. Processing mechanism 700-1 may include template mnemonics 710-1, a mnemonic multiplexor (MUX) 720-1, a header count 730-1, a barrel byte shifter 740-1, and a temporary N-buffer 750-1.

Template mnemonics 710-1 may include "4" mnemonics of the selected particular template, as received from template/constant reader 514.

Mnemonic multiplexor 720-1 may include hardware or a combination of hardware and software that may receive the "4" template mnemonics 710-1, and may multiplex (or join) template mnemonics 710-1 together. Mnemonic multiplexor 720-1 may provide the multiplexed template mnemonics 710-1 to barrel byte shifter 740-1.

In one example, individual header bytes, corresponding to template mnemonics 710-1, may be prepared prior to providing template mnemonics 710-1 to mnemonic multiplexor 720-1. For example, a L3_ETYP mnemonic (Table 2) may cause a Layer 3 ethertype to be inserted into N-buffer 556 at a corresponding position; a DLPORT_TAG mnemonic may cause a 4B DLPORT tag to be inserted into the output header; and a ELENGTH mnemonic may cause an IEEE 802.3 Ethernet length to be computed and inserted at an indicated position.

Header count 730-1 may include a header count associated with a packet. Barrel byte shifter 740-1 may include hardware or a combination of hardware and software that may receive the multiplexed template mnemonics 710-1 and header count 730-1, and may shift or rotate template mnemonics 710-1 by any number of bits in a single operation. Barrel byte shifter 740-1 may provide the altered template mnemonics 710-1 to temporary N-buffer 750-1.

Temporary N-buffer 750-1 may include hardware or a combination of hardware and software that may receive the altered template mnemonics 710-1, and may provide (if necessary) the altered template mnemonics 710-1 to barrel byte shifter for further processing. Otherwise, temporary N-buffer 750-1 may provide the altered template mnemonics 710-1 to multiplexor 760.

Multiplexor 760 may include hardware or a combination of hardware and software that may receive the altered template mnemonics 710-1, 710-2, and 710-3, and may multiplex (or join) the altered template mnemonics 710-1, 710-2, and 710-3 together. Multiplexor 760 may provide the multiplexed template mnemonics 710-1, 710-2, and 710-3 to barrel byte shifter 770.

Barrel byte shifter 770 may include hardware or a combination of hardware and software that may receive byte count 780 and the multiplexed template mnemonics 710-1, 710-2, and 710-3. Barrel byte shifter 770 may shift or rotate the multiplexed template mnemonics 710-1, 710-2, and 710-3, by any number of bits in a single operation, in order to form N-buffer 556.

Although FIG. 7 shows example functional components of N-buffer builder 526, in other implementations, N-buffer builder 526 may include fewer functional components, different functional components, differently arranged functional components, or additional functional components than depicted in FIG. 7. Alternatively, or additionally, one or more functional components of N-buffer builder 526 may perform one or more other tasks described as being performed by one or more other functional components of N-buffer builder 526.

Returning to FIG. 5, M, S-buffer builder/service header creator 528 may include hardware or a combination of hardware and software that may receive QoS mapping parameters 550, protocol bytes 552 for sub-headers of the packet, and information bits 554. M, S-buffer builder/service header creator 528 may create M-buffer 558 (e.g., a MPLS stack), S-buffer 560 (e.g., a special header), and service header 562 based on the receive information, and may provide M-buffer 558, S-buffer 560, and service header 562 to header merger 532.

To create M-buffer 558, M, S-buffer builder/service header creator 528 may obtain MPLS tags from the EDF notification, and may define fields for the MPLS tags in M-buffer 558. M, S-buffer builder/service header creator 528 may define a field for a number of valid MPLS tags, and may overwrite EXP fields in the MPLS tags based on QoS mapping parameters 550.

To create S-buffer 560, M, S-buffer builder/service header creator 528 may compute a total packet length as a number of bytes in the packet after S-buffer 560 plus a length of S-buffer 560. M, S-buffer builder/service header creator 528 may calculate an incremental header checksum with the modified total packet length value, and modify the total packet length and header checksum fields with the new values. M, S-buffer builder/service header creator 528 may form S-buffer 560 with the valid bytes, and may generate a byte count variable.

M, S-buffer builder/service header creator 528 may generate service header 562 (e.g., a loopback header) using a L2L header as a starting point. Depending on the notification type, M, S-buffer builder/service header creator 528 may modify specific fields of the L2L header, with incoming values in the notification, to create service header 562.

R-buffer builder 530 may include hardware or a combination of hardware and software that may receive information 548, QoS mapping parameters 550, protocol bytes 552 for sub-headers of the packet, and information bits 554. R-buffer builder 530 may create R-buffer 564 (e.g., Layer 3 data formed from header cell 546) based on the receive information, and may provide R-buffer 564 to header merger 532. In one example implementation, R-buffer 530 may modify Layer 3 header types (e.g., IPv4, IPv6, MPLS, and FC), to generate R-buffer 564, using the functional components depicted in FIG. 8.

Figure 8:
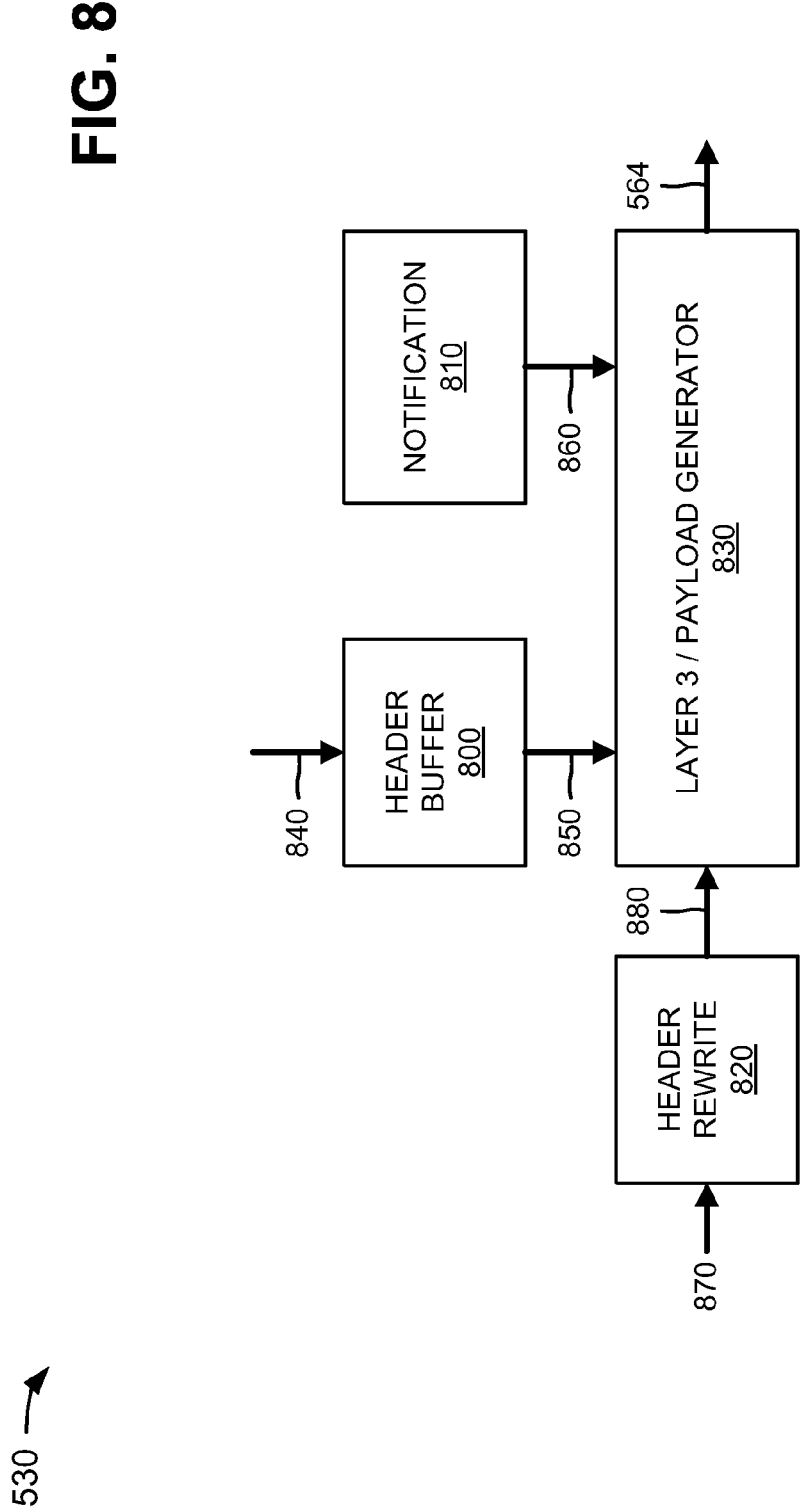
FIG. 8 is a diagram of example functional components of a R-buffer builder component depicted in FIG. 5.

FIG. 8 is a diagram of example functional components of R-buffer builder 530. In one implementation, the functions described in connection with FIG. 8 may be performed by one or more components (e.g., provided input ports 210 or output ports 230) of device 200 (FIG. 2). As illustrated in FIG. 8, R-buffer builder 530 may include a header buffer 800, a notification 810, a header rewrite 820, and a Layer 3/payload generator 830.

Header buffer 800 may include hardware or a combination of hardware and software that may receive a Layer 3 offset notification 840 (e.g., that indicates where Layer 3 bytes begin), and may strip leading bytes of a packet (e.g., based on notification 840). Header buffer 800 may provide the remaining bytes of the packet to Layer 3/payload generator 830 as indicated by reference number 850.

Notification 810 may include hardware or a combination of hardware and software that may determine reuse fields 860 of the packet, and may provide reuse fields 860 to Layer 3/payload generator 830.

Header rewrite 820 may include hardware or a combination of hardware and software that may receive a rewrite control notification 870, and may modify selected fields of the packet header based on rewrite control notification 870. For example, header rewrite 820 may modify time to live (TTL) fields, QoS fields, ECN fields, etc. Header rewrite 820 may provide the packet header with the modified fields to Layer 3/payload generator 830, as indicated by reference number 880.

Layer 3/payload generator 830 may include hardware or a combination of hardware and software that may receive remaining bytes 850 of the packet, reuse fields 860, and packet header 880 with the modified fields. Layer 3/payload generator 830 may generate R-buffer 564 based on the received information.

In one example, if a TTL update rule requires a TTL update in an IPV4 header, Layer 3/payload generator 830 may obtain a new TTL value for the header from the notification, and may write the new TTL value in a TTL byte of the header in R-buffer 564. As a result of QoS mapping (e.g., by QoS mapper 512), a new type of service (TOS) value may be available. Layer 3/payload generator 830 may write this new value into a TOS field of the header if this rewrite is enabled.

In another example, if a TTL update rule requires a hop limit update, Layer 3/payload generator 830 may obtain a new value for the hop limit from the notification, and may write the new value into the hop limit byte of an IPv6 header in R-buffer 564. A traffic class (TC) field in the IPv6 header may be updated in a manner similar to the TOS field of the IPv4 header. In other examples, Layer 3/payload generator 830 may rewrite source ID (SID) and destination ID (DID) fields of a FC header, and may rewrite MPLS EXP and TTL fields.

Although FIG. 8 shows example functional components of R-buffer builder 530, in other implementations, R-buffer builder 530 may include fewer functional components, different functional components, differently arranged functional components, or additional functional components than depicted in FIG. 8. Alternatively, or additionally, one or more functional components of R-buffer builder 530 may perform one or more other tasks described as being performed by one or more other functional components of R-buffer builder 530.

Returning to FIG. 5, header merger 532 may include hardware or a combination of hardware and software that may receive N-buffer 556, M-buffer 558, S-buffer 560, service header 562, and R-buffer 564, and may merge N-buffer 556, M-buffer 558, S-buffer 560, and R-buffer 564 (e.g., protocol sub-headers) to create a new protocol header 566 for the packet. Header merger 532 may forward the packet based on new protocol header 566. Header merger 532 may also create a compact notification 568 for the packet, and may forward service header 562, the packet (e.g., with new protocol header 566), and compact notification 568 to an output queue manager (OQM) of network device 110 (not shown). Header merger 532 may provide a notification 570 to ESMP 325 (FIG. 3), and may generate Lport, Layer 2 domain counter updates 572. In one example, notification 570 may include a variety of fields that provide information associated with the packet. Examples of such fields are provided in Table 4 (below).

TABLE 4

| Field | Width | Description |
| --- | --- | --- |
| smp | 1 | May indicate that this is a sampled packet. If this bit is set the sampling decisions may be skipped. |
| smp_vec | 64 | Sampling vector corresponding to a number of sampling classes. |
| notif_type | 3 | May indicate the type of packet. |
| trapcode | 8 | Trapcode that may indicate an exception. |
| rb_ptr | 11 | Results buffer pointer. |
| tc | 4 | Traffic class. |
| tloq_num | 8 | TL Output Queue number of the packet. |
| tqoq_num | 9 | TQ based output queue number. May be used by ESMP for sending credit adjustments. |
| erw_tx_len | 14 | TX packet length. |
| l2l_pyld_len | 14 | L2L payload length. This may be used to compute credit adjustments in ESMP. |
| mac_mvd | 1 | MAC moved indication. |

Although FIG. 5 shows example functional components of ERW 320, in other implementations, ERW 320 may include fewer functional components, different functional components, differently arranged functional components, or additional functional components than depicted in FIG. 5. Alternatively, or additionally, one or more functional components of ERW 320 may perform one or more other tasks described as being performed by one or more other functional components of ERW 320.

Figure 9:
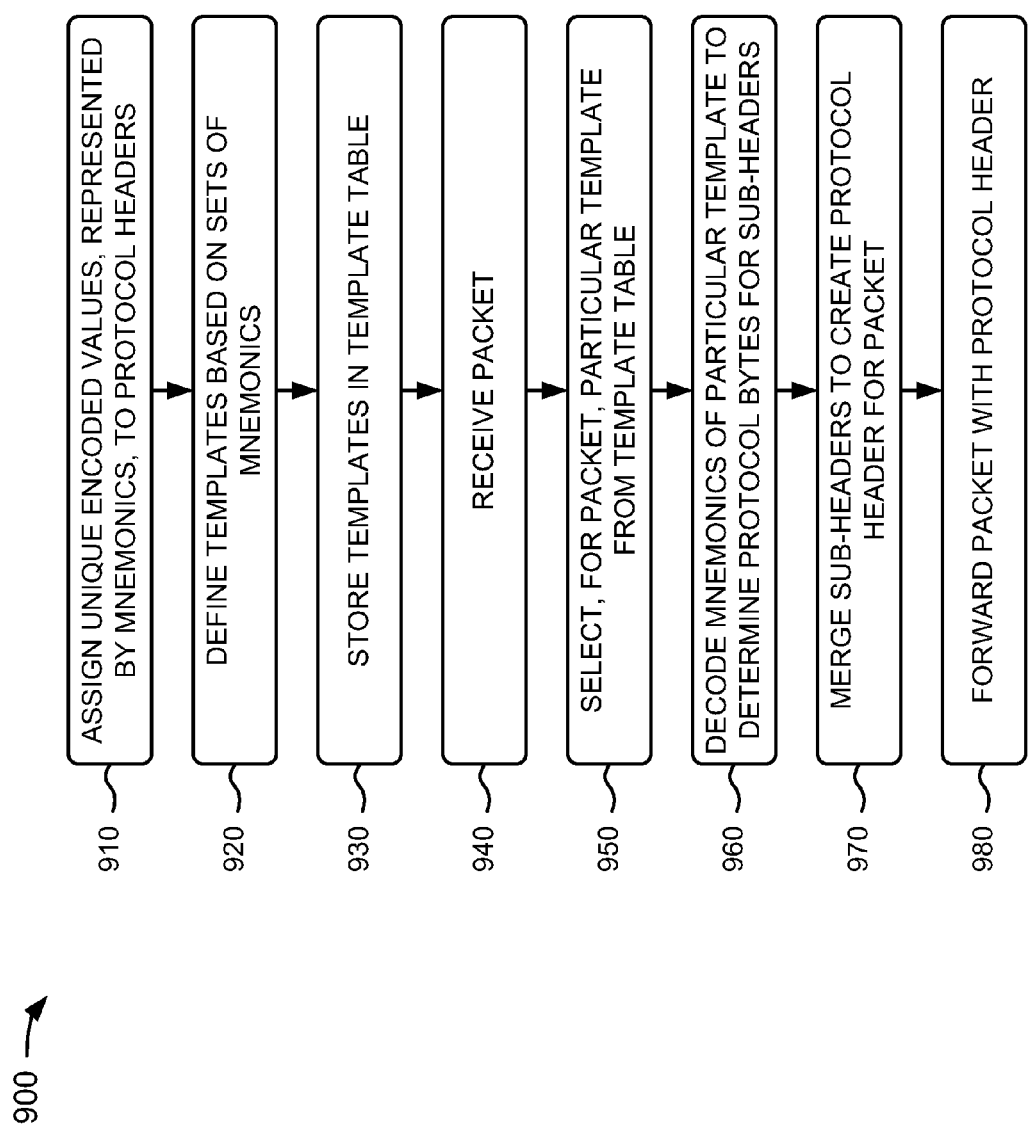
FIGS. 9-11 are flow charts of an example process for providing fast packet encapsulation using templates according to implementations described herein.
Figure 10:
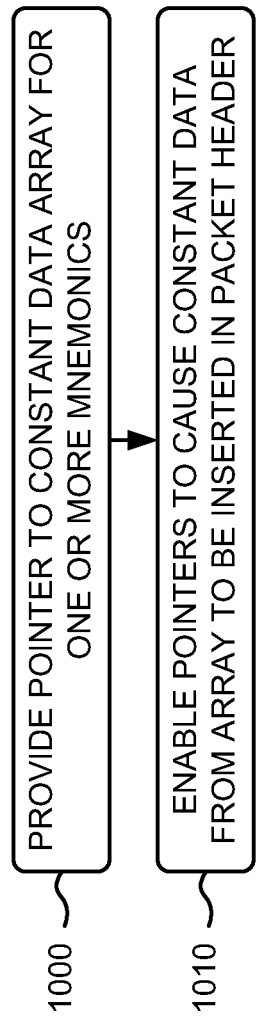
Figure 11:
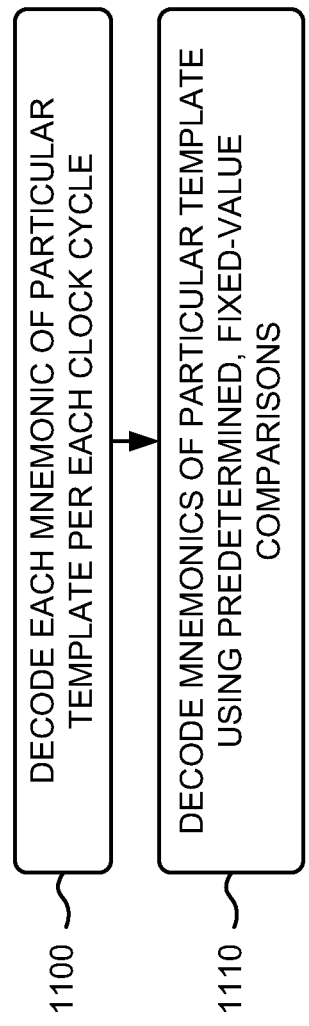

FIGS. 9-11 are flow charts of an example process 900 for providing fast packet encapsulation using templates according to implementations described herein. In one implementation, process 900 may be performed by network device 110. In another implementation, some or all of process 900 may be performed by one or more components (e.g., ERW 320) of network device 110.

As illustrated in FIG. 9, process 900 may include assigning unique encoded values, represented, by mnemonics, to protocol headers (block 910), defining templates based on the sets of mnemonics (block 920), and storing the templates in a template table (block 930). For example, in implementations described above in connection with FIG. 5, template table 516 may store encapsulation template information. The encapsulation template information may include a set of enumerated mnemonics (e.g., encoded values) programmed in a specific sequence that indicates how an outgoing packet header should look. The enumerated values may represent Layer 2 or Layer 3 protocols. In some examples, the enumerated value may be a direct pointer to constant table 518, from which encapsulation data may be obtained. The two types of fields (e.g., an enumerated value or a pointer) may be distinguished by looking at a bit in the field.

As further shown in FIG. 9, process 900 may include receiving a packet (block 940), selecting, for the packet, a particular template from the template table (block 950), and decoding mnemonics of the particular template to determine protocol bytes for sub-headers (block 960). For example, in implementations described above in connection with FIGS. 1 and 5, network device 110 may receive packet 130 (e.g., at later point in time after creation of template table 516), and template/constant reader 514 of network device 110 (e.g., of ERW 320) may select a particular template from template table 516 for the packet (e.g., packet 130) based on parameters/data values 540. Template/constant reader 514 may decode mnemonics of the particular template to determine protocol bytes 552 for sub-headers of the packet.

Returning to FIG. 9, process 900 may include merging the sub-headers to create a protocol header for the packet (block 970), and forwarding the packet with the protocol header (block 980). For example, in implementations described above in connection with FIG. 5, header merger 532 of network device 110 may receive N-buffer 556, M-buffer 558, S-buffer 560, service header 562, and R-buffer 564, and may merge N-buffer 556, M-buffer 558, S-buffer 560, and R-buffer 564 (e.g., protocol sub-headers) to create a new protocol header 566 for the packet. Header merger 532 may forward the packet based on new protocol header 566.

Process block 920 may include the process blocks depicted in FIG. 10. As shown in FIG. 10, process block 920 may include providing a pointer to a constant data array for one or more mnemonics (block 1000), and enabling the pointers to cause constant data from the array to be inserted in the packet header (block 1010). For example, in implementations described above in connection with FIG. 6, template table 516 may include enumerated value mnemonics 610-1, 610-2, and 610-3, and end of headers (or NULL) mnemonic 620. Mnemonics 610-1, 610-2, and 610-3 may include enumerated values referring to protocol headers or a pointer to intermediate data provided in constant table 518. In one example, mnemonics 610-1 and 610-2 may include enumerated values referring to protocol headers, while mnemonic 610-3 may include a pointer to intermediate data (e.g., data 640) provided in constant table 518. Constant table 518 may include length (len) field 630 that indicates a number of valid bytes, and data field 640 that includes data to be read. Constant table 518 data may be read if a mnemonic of a template has a pointer to constant table 518, and the data may be inserted into the packet header.

Process block 960 may include the process blocks depicted in FIG. 11. As shown in FIG. 11, process block 960 may include decoding each mnemonic of the particular template per each clock cycle (block 1100), and decoding the mnemonics of the particular template using predetermined, fixed-value comparisons (block 1110). For example, in implementations described above in connection with FIGS. 1 and 5, network device 110 may decode each mnemonic of the particular template per each clock cycle, and may decode the mnemonics of the particular template using predetermined fixed-value comparisons. In one example, template/constant reader 514 of network device 110 may decode and execute the mnemonics of the particular template to determine protocol bytes 552 for sub-headers of the packet.

Systems and/or methods described herein may provide fast packet encapsulation using templates. The systems and/or methods may achieve line-rate performance (e.g., without any micro-code), may provide flexibility for packet encapsulation (e.g., via selection from a variety of protocol templates), and may simplify packet encapsulation. The systems and/or methods may assign unique encoded values (e.g., represented by mnemonics) to various protocol headers, and may define a template as a set of mnemonics arranged in a sequence. The sequence of the mnemonics may determine a protocol stack provided in a packet. The systems and/or methods may generate a variety of templates, and may store the templates in a template table. When a packet is received, the systems and/or methods may select a particular template from the template table for the packet (e.g., based on a packet processing decision prior to packet encapsulation). The systems and/or methods may decode the mnemonics of the particular template using pre-determined, fixed value comparisons and by processing one mnemonic per clock cycle. Decoding of the mnemonics may determine protocol bytes for sub-headers of the packet. The systems and/or methods may assemble the individual sub-headers to form a complete protocol header for the packet, and may forward the packet with the protocol header.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 9-11, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
assigning, by a network device, unique encoded values, represented by mnemonics, to protocol headers supported by the network device,
each mnemonic, of the mnemonics, representing one of a name of a protocol header of the protocol headers, a sub-header of a network header, or a sub-field of the network header;
defining, by the network device, a plurality of templates based on the assigned unique encoded values;
storing, by the network device, the plurality of templates in a template table that stores encapsulation template information,
the encapsulation template information including a particular template, of the plurality of templates, that includes a set of the mnemonics programmed in a particular sequence that indicates how the protocol, header should look; and
creating, based on the template table and by the network device, the protocol header for a packet.

2. The method of claim 1, where the mnemonics include one or more of:
an Ethernet base header mnemonic,
a virtual local area network (VLAN) mnemonic,
a pass through opaque tag mnemonic,
a congestion notification tag mnemonic,
a destination port information tag mnemonic,
a length field mnemonic, or
a Layer 3 ethertype mnemonic.

3. The method of claim 1, where creating the protocol header for the packet includes:

receiving the packet;
selecting, for the packet, the particular template from the plurality of templates provided in the template table;
decoding the set of the mnemonics included in the particular template to determine protocol bytes for sub-headers; and
merging, based on the particular sequence of the set of the mnemonics, the sub-headers to create the protocol header for the packet.

4. The method of claim 3, further comprising:
forwarding the packet with the protocol header.

5. The method of claim 3, where decoding the set of the mnemonics further comprises:
decoding, based on clock cycles of the network device, the set of the mnemonics by using predetermined, fixed-value comparisons.

6. The method of claim 1, where the particular template further includes a pointer to constant data that is to be inserted into the protocol header.

7. The method of claim 1, where the particular sequence specifies a sequence of three or more buffers in the protocol header.

8. A network device comprising:
a memory to store a template table that stores encapsulation template information; and
a processor to:
assign unique encoded values, represented by mnemonics, to protocol headers supported by the network device,
each mnemonic, of the mnemonics, representing one of a name of a protocol header of the protocol headers, a sub-header of a network header, or a sub-field of the network header,
define a plurality of templates based on the assigned unique encoded values,
store the plurality of templates in the template table,
the encapsulation template information including a particular template, of the plurality of templates, that includes a set of the mnemonics programmed in a particular sequence that indicates how the protocol header should look, and
use the template table to create the protocol header for a packet based on the particular template.

9. The network device of claim 8, where the mnemonics include one or more of:
an Ethernet base header mnemonic,
a virtual local area network (VLAN) mnemonic,
a pass through opaque tag mnemonic,
a congestion notification tag mnemonic,
a destination port information tag mnemonic,
a length field mnemonic, or
a Layer 3 ethertype mnemonic.

10. The network device of claim 8, where, when using the template table to create the protocol header, the processor is to:
select, for the packet, the particular template from the plurality of templates provided in the template table,
decode the set of the mnemonics included in the particular template to determine protocol bytes for sub-headers, and
merge, based on the particular sequence of the set of the mnemonics, the sub-headers to create the protocol header for the packet.

11. The network device of claim 10, where the processor is further to:
forward the packet with the protocol header.

12. The network device of claim 10, where, when decoding the set of the mnemonics, the processor is to:
decode, per a clock cycle of the network device, a particular mnemonic of the set of the mnemonics included in the particular template.

13. The network device of claim 8, where the particular template further includes a pointer to constant data that is to be inserted into the protocol header.

14. The network device of claim 8, where the processor comprises an egress packet processor.

15. The network device of claim 8, where the processor comprises an egress rewrite component of the network device.

16. The network device of claim 8, where the protocol headers supported by the network device include Layer 2 and Layer 3 protocol headers.

17. A non-transitory computer-readable medium storing instructions, the instructions comprising:
one or more instructions that, when executed by a network device, cause the network device to:
assign unique encoded values, represented by mnemonics, to headers supported by the network device,
each mnemonic, of the mnemonics, representing one of a name of a header of the headers, a sub-header of the header, or a sub-field of the header,
define a plurality of templates based on the assigned unique encoded values,
store the plurality of templates in a template table that stores encapsulation template information,
the encapsulation template information including a particular template, of the plurality of templates, that includes a set of the mnemonics programmed in a particular sequence that indicates how the header should look, and
use the plurality of templates to create the header for a packet when the packet is being transmitted by the network device.

18. The non-transitory computer-readable medium of claim 17, where the instructions further comprise:
one or more instructions that, when executed by the network device, cause the network device to:
receive the packet,
select, for the packet, the particular template from the plurality of templates provided in the template table,
decode the set of the mnemonics included in the particular template to determine protocol bytes for sub-headers, and
combine, based on the particular sequence of the set of the mnemonics, the sub-headers to create the header for the packet.

19. The non-transitory computer-readable medium of claim 18, where the instructions further comprise:
one or more instructions that, when executed by the network device, cause the network device to:
forward the packet with the header.

20. The non-transitory computer-readable medium of claim 18, where the one or more instructions to decode the set of the mnemonics comprise:
one or more instructions that, when executed by the network device, cause the network device to:
use predetermined, fixed-value comparisons to decode the set of the mnemonics included in the particular template.

21. The non-transitory computer-readable medium of claim 17, where the particular template further includes a pointer to constant data that is to be inserted into the header.

22. The non-transitory computer-readable medium of claim 17, where the headers supported by the network device include Layer 2 and Layer 3 protocol headers.

23. The non-transitory computer-readable medium of claim 17, where the mnemonics include one or more of:
- an Ethernet base header mnemonic,
- a virtual local area network (VLAN) mnemonic,
- a pass through opaque tag mnemonic,
- a congestion notification tag mnemonic,
- a destination port information tag mnemonic,
- a length field mnemonic, or
- a Layer 3 ethertype mnemonic.

24. The non-transitory computer-readable medium of claim 17, where the particular sequence specifies a sequence of three or more buffers in the header.

* * * * *